United States Patent [19]
Viel

[11] Patent Number: 6,141,087
[45] Date of Patent: Oct. 31, 2000

[54] SYSTEM AND METHOD FOR MEASURING ENGINE ROTOR THRUST USING FABRY-PEROT FIBER SENSOR

[75] Inventor: Terrence E. Viel, Hamilton, Ohio

[73] Assignee: General Electric Company, Cincinnati, Ohio

[21] Appl. No.: 09/215,864

[22] Filed: Dec. 18, 1998

[51] Int. Cl.$^7$ ........................................................ G01B 9/02
[52] U.S. Cl. ............................ 356/35.5; 356/345; 356/352
[58] Field of Search ........................................ 356/345, 352, 356/35.5; 250/227.14, 227.19, 227.27; 385/12

[56] References Cited

U.S. PATENT DOCUMENTS

| | | | |
|---|---|---|---|
| 5,202,939 | 4/1993 | Belleville et al. | 250/227.27 |
| 5,345,519 | 9/1994 | Lu | 250/227.11 |
| 5,594,819 | 1/1997 | Narendran et al. | 250/227.14 |

*Primary Examiner*—Samuel A. Turner
*Attorney, Agent, or Firm*—Andrew C. Hess; Nathan D. Herkamp

[57] ABSTRACT

A system and method use an optical strain gage to measure engine bearing thrust. Reflecting surfaces, or mirrors, encapsulated in a housing, are separated by an initial gap. An incoming fiber receives light from an interferometer and transmits the light to the reflecting surfaces, which then reflect the light back to the interferometer. An engine load is introduced to a bearing element bonded to the housing, and the rotor thrust into the bearing element causes a change in the initial gap. An increase in the initial gap indicates tension and a decrease in the initial gap indicates compression.

17 Claims, 1 Drawing Sheet

SYSTEM AND METHOD FOR MEASURING ENGINE ROTOR THRUST USING FABRY-PEROT FIBER SENSOR

TECHNICAL FIELD

The present invention relates to gas turbine engines and, more particularly, to measurement of rotor thrust on gas turbine engines.

BACKGROUND OF THE INVENTION

Historically, the measurement of rotor thrust on gas turbine engines has been accomplished by the application of electrical resistance strain gages to an engine bearing housing or bearing race. The electrical output of the strain gage system is proportional to the bearing housing deflection imposed by the rotor thrust loading. Unfortunately, this electrical resistance strain gage technology of the existing art encounters several problems and limitations.

One problem encountered in the prior art is that the strain gage indicated output is dependent upon its temperature environment at any thrust load, thus inducing errors into the measurement. In addition, the strain gages are subject to mechanical fatigue failure and, thus, loss of signal. A third problem is that the strain gages are subject to electrical magnetic interference or other induced electrical noise, thus inducing errors into the thrust load measurement. Also, the strain gages are subject to hookup wiring configuration errors, resulting in a reversal of the indicated rotor thrust direction, meaning that the forward and aft thrust directions can be indicated incorrectly, unknowingly by the observer. A fifth problem encountered in the prior art is that the strain gages are not an absolute measurement, as they require an electrical tare balance and other thermal compensations. Furthermore, the required length of the strain gage extension leads contain a resistive load, producing a voltage drop from the strain gage sensor to the remote data readout system, and thereby producing an error in the thrust measurement. Yet another problem is that the temperature of the strain gage extension leads are subjected to various temperature gradients internally in the engine. This temperature change in the extension leads produces a change in the extension lead resistance, in turn producing an error in the thrust measurement. Finally, the electrical resistance strain gage possesses a calibration constant known as the gage factor. This constant is defined as the unit change of electrical resistance of the strain gage for a given strain input. This gage factor also varies as a function of temperature and can produce an error in the indicated thrust measurement.

It is seen, therefore, that it would be desirable to have an improved rotor thrust measurement apparatus and method which overcomes the problems encountered by the strain gages historically used to measure rotor thrust.

SUMMARY OF THE INVENTION

The present invention provides a rotor thrust measurement and balance control system without the use of a traditional strain gage, thereby eliminating errors and problems consequent to the use of such a strain gage in rotor measurement applications.

In accordance with one aspect of the present invention, a system and method use an optical strain gage to measure engine bearing thrust. Reflecting surfaces, or mirrors, encapsulated in a housing, are separated by an initial gap. An incoming fiber receives light from an interferometer and transmits the light to the reflecting surfaces, which then reflect the light back to the interferometer. An engine load is introduced into a bearing that transfers the engine load to the optical strain gage to cause the change in the initial optical gap. The bearing is either stretched or compressed, and transfers the load through the adhesive to the optical strain gage. An increase in the initial gap indicates tension and a decrease in the initial gap indicates compression.

In the drawings as hereinafter described, a preferred embodiment is depicted; however, various other modifications and alternative constructions can be made thereto without departing from the true spirit and scope of the invention.

BRIEF DESCRIPTION OF THE DRAWING

The novel features of the invention are set forth with particularity in the appended claims. The invention itself, however, both as to organization and method of operation, together with objects and advantages thereof, may best be understood by reference to the following description taken in conjunction with the accompanying drawing in which:

DETAILED DESCRIPTION OF THE INVENTION

Figure 1:
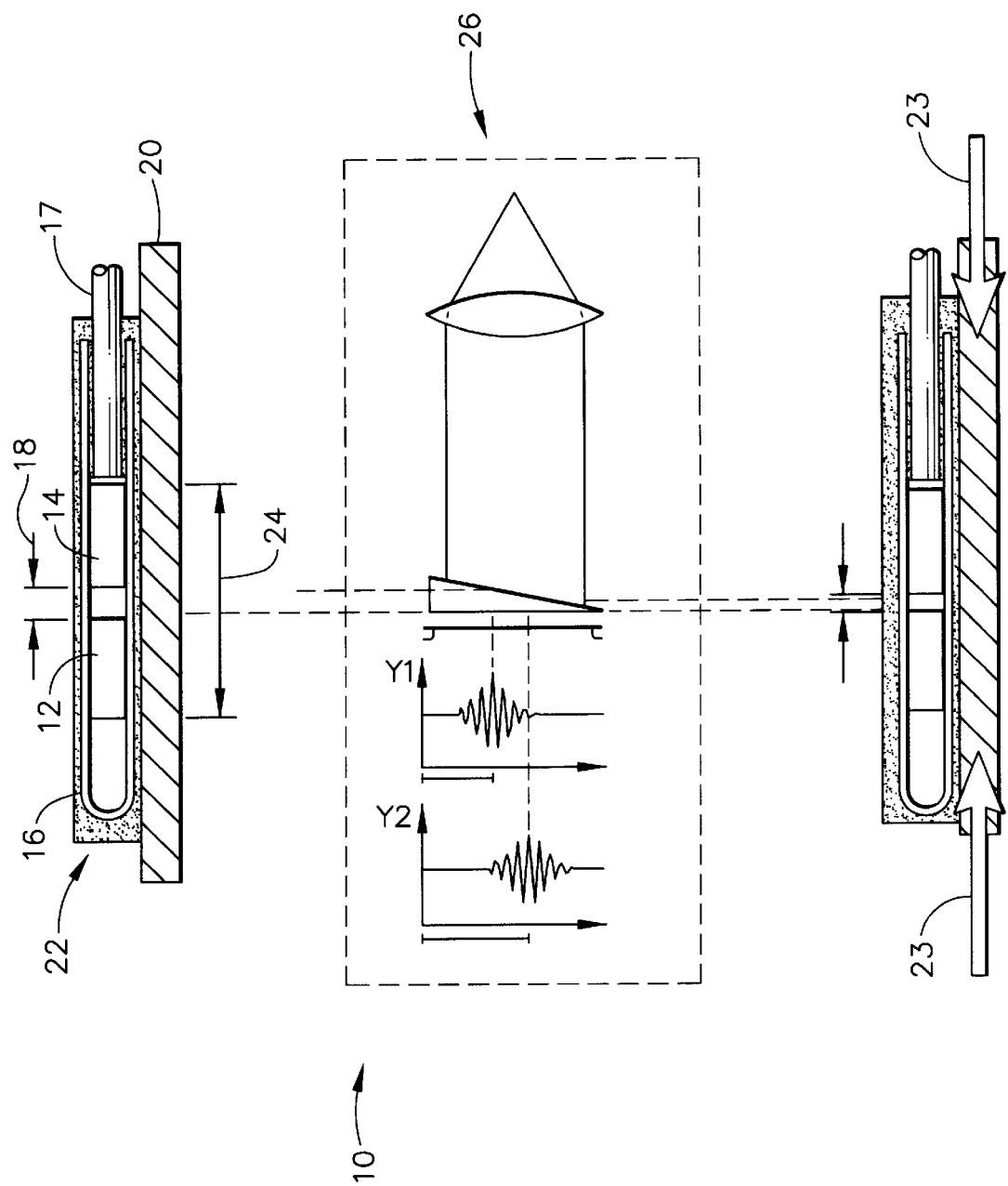
FIG. 1 is a schematic block diagram of an optical strain gage rotor thrust measurement system, in accordance with the present invention.

The present invention proposes using a fiber optic sensor to measure engine rotor thrust. Referring now to FIG. 1, the fiber optic strain gage 10 comprises two reflecting surfaces, or mirrors, 12 and 14 which are encapsulated in a micro-tube 16, and an incoming fiber 17. Light comes through the fiber from a signal box, such as a Fabry-Perot Interferometer (FPI) 26, and goes through mirror 14 to mirror 12, where it is reflected back through mirror 14, which is semi-transparent. Hence, the light is reflected back to the interferometer 26 from the mirrors 12 and 14, and the box 26 measures the interference. An increase in the gap between the mirrors, as interpreted by box 26, indicates tension; and a decrease in the gap between the mirrors 12, as interpreted by box 26, indicates compression.

The space or optical gap 18 separating the mirrors 12 is defined as a cavity length L. When bonded to bearing housing 20 using any suitable means such as an adhesive 22, the strain from the rotor thrust is induced into the bearing housing 20. Typically, a thin adhesive line or layer is introduced below the micro-tube and above the bearing, and then adhesive 22 covers the structure for protection. The strain is transferred into the optical strain gage as a cavity length 18 change. Arrows 23 represent the bearing housing load in a compression state; in a state of tension, the arrows would necessarily point outward, in the opposite direction. When the cavity in the optical strain increases in length, the rotor thrust load is in tension; and when the cavity length decreases, the rotor thrust load is in compression. This change in cavity length as compared to the original gage length 24 can then be defined as the indicated strain level, and is measured at box 26. Light reflected in the FPI is wavelength modulated in response to the cavity length and any change in the cavity length. In accordance with the present invention, the optical strain gage 10 can detect changes in the cavity length in nanometers resolution.

In a preferred embodiment of the present invention, the optical strain gage is designed to be thermally self compensating. This feature can be achieved by constructing the strain gage so that reflecting surfaces 12 is made of a metallic fiber similar to the bearing housing parent material.

Then, if the optical strain gage is submitted to a thermal cycle, the expansion or contraction will thermally match that of the parent bearing housing material.

In a further preferred embodiment of the present invention, the optical strain gage does not have a metallic grid, as is found in an electrical resistance strain gage. Since the metallic grid in the electrical strain gages of the existing art are subject to fatigue type failures from alternating strain cycles, the elimination of this grid in the gage of the present invention provides an advantage. Instead, the primary component of the optical strain gage is the glass tube 16 in which the reflecting mirrors 12 and 14 are encapsulated.

It is a further advantage of the present invention that the optical strain gage, being an optical device, is completely insensitive to EMI or any other type of electrical interference. Furthermore, the optical strain gage, being an optical device and not an electrical resistive device, means that the strain gage of the present invention is not sensitive to lead length losses. The optical strain gage being an optical device with glass fibers transmitting light makes the gage insensitive to lead temperature in the engine environment. Finally, the optical strain gage, being an optical device, does not have a "gage factor" calibration constant which varies as a function of temperature. The optical strain gage only measures the mechanical change of the cavity length which only varies as a function of the rotor thrust load input. The optical strain gage, in accordance with the present invention, comprises a single readout and connector, so that it is not possible to connect the optical strain gage to the readout device and measure the thrust load in the undesired reverse direction. The optical strain gage is an absolute type measurement. The only variable that will affect the output of this optical strain gage is a mechanical deflection of the gage cavity induced by rotor thrust force into the bearing housing. The system can be disconnected at any time and reconnected with out any tare adjustments, calibrations or other compensations. With the optical strain gage of the present invention, the measurement of the direction of rotor thrust load is always absolute.

The optical strain gage has the ability to measure the cavity length to a very high resolution, typically 0.001 micrometers, resulting in a high accuracy rotor thrust measurement. The optical strain gage of the present invention further has the ability to measure the actual deflection of the parent bearing housing with a resolution of nanometers, thus providing an additional piece of engineering information about the engine bearing.

While the principles of the invention have now been made clear in an illustrative embodiment, there will become obvious to those skilled in the art many modifications in structure, arrangement, and components used in the practice of the invention and otherwise which are particularly adapted for specific operating requirements without departing from those principles. For example, one alternative that may be considered is to use the optical strain gage to measure other critical dynamic operating parameters of the engine bearing. Using the sensor in the dynamic mode, the bearing ball passing frequency or slip rate could also be monitored by the customer, providing valuable engineering information to more accurately predict engine bearing life. Additionally, an optical sensor constructed in accordance with the present invention can be configured to measure temperature and provide thermal engineering data about the bearing to the customer. Furthermore, the application of multiple optical strain gages could be incorporated with an optical switching device to interrogate multiple optical sensors on a single bearing housing or other instrumented bearings throughout the engine, which would provide enhanced rotor thrust or other bearing load information to the user. Finally,the optical strain gage readout device could be incorporated into a customer rotor thrust measurement and control device for setting various engine operating parameters, such as bleed schedules, power settings, vbv schedules, A4 area, and cavity pressures.

The present invention proposes a novel use of an optical strain gage, specifically, to measure the interference between two waves. When the cavity in the optical strain increases, the rotor thrust load is in tension; and when the cavity decreases, the rotor thrust load is in compression. This change in cavity length as compared to the original gage length is used to measure rotor thrust on a gas turbine engine.

Having described the invention in detail and by reference to the preferred embodiment thereof, it will of course be apparent that other modifications and variations are possible without departing from the scope of the invention defined in the appended claims. The appended claims are therefore intended to cover and embrace any such modifications, within the limits only of the true spirit and scope of the invention.

What is desired to be secured by Letters Patent is the invention as defined in the following claims:

What is claimed is:

1. A system for measuring engine rotor thrust comprising:
   first and second reflecting surfaces encapsulated in a housing, the first and second reflecting surfaces being separated by an initial gap;
   an incoming fiber for transmitting light to the first and second reflecting surfaces;
   a bearing element bonded to the housing;
   means for introducing an engine load into the bearing element, the rotor thrust into the bearing element causing a change in the initial gap; and
   a means for interpreting the change in the initial gap, whereby an increase in the initial gap indicates tension and a decrease in the initial gap indicates compression.

2. A system as claimed in claim 1 wherein the means for interpreting the change in the initial gap comprises an interferometer.

3. A system as claimed in claim 2 wherein the incoming fiber further comprises an incoming fiber for receiving light from the interferometer.

4. A system as claimed in claim 1 wherein the means for introducing an engine load into the bearing element further comprises means for introducing a rotor thrust into the bearing.

5. A system as claimed in claim 1 wherein the first and second reflecting surfaces comprise mirrors.

6. A system as claimed in claim 1 further comprising a thin adhesive layer between the housing and the bearing element.

7. A system as claimed in claim 6 further comprising an adhesive protective layer around the housing, the bearing element and the thin adhesive layer.

8. A system as claimed in claim 1 wherein the system comprises a thermally self-compensating system.

9. A system as claimed in claim 1 wherein the housing comprises a glass tube.

10. A method for measuring engine rotor thrust comprising the steps of:
    providing first and second reflecting surfaces, the first and second reflecting surfaces being separated by an initial gap;

encapsulating the first and second reflecting surfaces in a housing;
transmitting light to the first and second reflecting surfaces;
bonding a bearing element to the housing;
introducing an engine load into the bearing element, the rotor thrust into the bearing element causing a change in the initial gap; and
interpreting the change in the initial gap, whereby an increase in the initial gap indicates tension and a decrease in the initial gap indicates compression.

11. A method as claimed in claim 10 wherein the step of interpreting the change in the initial gap comprises the step of using an interferometer.

12. A method as claimed in claim 11 wherein the step of transmitting light to the first and second reflecting surfaces further comprises the step of fusing an incoming fiber to the housing, the incoming fiber receiving light from the interferometer.

13. A method as claimed in claim 10 wherein the step of introducing an engine load into the bearing element further comprises the step of introducing a rotor thrust into the bearing.

14. A method as claimed in claim 10 wherein the first and second reflecting surfaces comprise mirrors.

15. A method as claimed in claim 10 further comprising the step of introducing a thin adhesive layer between the housing and the bearing element.

16. A method as claimed in claim 15 further comprising the step of applying an adhesive protective layer around the housing, the bearing element and the thin adhesive layer.

17. A method as claimed in claim 10 wherein the housing comprises a glass tube.

* * * * *